(12) United States Patent
Sato

(10) Patent No.: US 7,210,235 B2
(45) Date of Patent: May 1, 2007

(54) APPARATUS AND METHOD FOR DETECTING AZIMUTH AND INCLINATION ANGLE, PROGRAM FOR DETECTING THE SAME, AND PORTABLE TERMINAL DEVICE FOR DETECTING THE SAME

(75) Inventor: Hideki Sato, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 11/479,970

(22) Filed: Jun. 30, 2006

(65) Prior Publication Data

US 2007/0000140 A1    Jan. 4, 2007

(30) Foreign Application Priority Data

Jul. 1, 2005    (JP)    ............................. 2005-193547

(51) Int. Cl.
G01C 17/02    (2006.01)
(52) U.S. Cl. .................... 33/355 R; 33/356; 33/273
(58) Field of Classification Search .............. 33/355 R, 33/356, 273, 310, 313
See application file for complete search history.

(56) References Cited

U.S. PATENT DOCUMENTS

| 6,523,271 B2 * | 2/2003 | Kato ........................ 33/355 R |
| 7,086,164 B2 * | 8/2006 | Satoh et al. ................... 33/316 |
| 2002/0014016 A1 * | 2/2002 | Kato ........................ 33/355 R |
| 2005/0072011 A1 * | 4/2005 | Miyashita et al. ......... 33/355 R |
| 2006/0123642 A1 * | 6/2006 | Lee et al. .................. 33/355 R |

FOREIGN PATENT DOCUMENTS

| JP | 10-185608 | 7/1998 |
| JP | 2003-172633 A | 6/2003 |

* cited by examiner

Primary Examiner—Yaritza Guadalupe-McCall
(74) Attorney, Agent, or Firm—Dickstein Shapiro LLP

(57) ABSTRACT

In an azimuth/inclination-angle detection apparatus, a measurement data obtaining unit obtains first and second measurement data sets g and h from acceleration and magnetic sensors, respectively. A first computation unit calculates an azimuth $\alpha 0$, an elevation angle $\beta 0$, and a geomagnetism depression angle $\theta 0$ from the measurement data sets g and h. An averaging unit accumulates and averages the geomagnetism depression angle $\theta 0$ so as to obtain a value to be used as a geomagnetism depression angle $\theta$. A second computation unit calculates an azimuth $\alpha$ and an elevation angle $\beta$ from the second measurement data set h and the geomagnetism depression angle $\theta$. When a plurality of solutions exist, they are stored as candidates $(\alpha 1, \beta 1)$ and $(\alpha 2, \beta 2)$. A selection unit selects a detection value $(\alpha, \beta)$ from the candidates $(\alpha 1, \beta 1)$ and $(\alpha 2, \beta 2)$ with reference to the above-described values $\alpha 0$ and $\beta 0$ serving as reference values.

10 Claims, 5 Drawing Sheets

FIG.7

| date and time when obtaining $\theta 0$ | geomagnetism depression angle $\theta 0$ |
|---|---|
| 2005/6/8 10:49:53 | 2.3 |
| 2005/6/8 10:49:52 | 2.3 |
| 2005/6/8 10:49:52 | 2.3 |
| 2005/6/8 10:49:52 | 2.3 |
| 2005/6/8 10:49:52 | 2.3 |
| 2005/6/8 10:49:52 | 2.3 |
| 2005/6/8 10:25:11 | 2.2 |
| 2005/6/8 10:25:10 | 2.2 |

FIG.8

| date and time when obtaining $\theta 0$ | position data when obtaining $\theta 0$ | geomagnetism depression angle $\theta 0$ |
|---|---|---|
| 2005/6/8 10:49:53 | 138.30.00 36.02.00 | 2.3 |
| 2005/6/8 10:49:52 | 138.30.00 36.02.00 | 2.3 |
| 2005/6/8 10:49:52 | 138.30.00 36.02.00 | 2.3 |
| 2005/6/8 10:49:52 | 138.30.00 36.02.00 | 2.3 |
| 2005/6/8 10:49:52 | 138.30.00 36.02.00 | 2.3 |
| 2005/6/8 10:49:52 | 138.30.00 36.02.00 | 2.3 |
| 2005/6/8 10:25:11 | 138.30.02 36.02.05 | 2.2 |
| 2005/6/8 10:25:10 | 138.30.02 36.02.05 | 2.2 |

APPARATUS AND METHOD FOR DETECTING AZIMUTH AND INCLINATION ANGLE, PROGRAM FOR DETECTING THE SAME, AND PORTABLE TERMINAL DEVICE FOR DETECTING THE SAME

BACKGROUND OF THE INVENTION

1. Field of the Invention

The present invention relates to a technique for detecting azimuth and inclination angle of a center axis of a device of interest in a terrestrial coordinate system through detection of geomagnetism components and gravitational force components, and more particularly, to a technique for improving its detection accuracy.

2. Description of the Related Art

Recently, there have been developed portable terminal devices, such as a cellular phone, which include a magnetic sensor for detecting geomagnetism and an acceleration sensor for detecting inclination of the body of the device in order to measure azimuth, in accordance with the trend of their performance enhancement. Such a device is advantageous in that accuracy of azimuth detection can be improved by means of correction based on inclination of the device body.

Conventional techniques employing such correction are disclosed in Japanese Patent Application Laid-Open (kokai) Publication Nos. H10-185608 and 2003-172633. Both the techniques use a geomagnetism sensor and an acceleration sensor, and improve its detection accuracy through coordinated operation of these sensors.

However, when a detection apparatus as disclosed in the publications is incorporated in a portable terminal device such as a cellular phone, there arises a problem in that the acceleration sensor detects an acceleration component produced as a result of movement of the portable terminal device, and the detected inclination of the portable terminal device involves an error, whereby the azimuth correction amount involves an error, and the detection accuracy deteriorates. This problem cannot be solved by the techniques disclosed in the above-mentioned publications.

SUMMARY OF THE INVENTION

In view of the foregoing, an object of the present invention is to provide a technique for detecting an azimuth component of a center axis of a device of interest in a terrestrial coordinate system through detection of geomagnetism components and gravitational force components, in which influence of errors involved in the gravitational force components is reduced so as to improve detection accuracy in detecting the azimuth component of the center axis in the terrestrial coordinate system.

In order to achieve the above object, the present invention provides an apparatus, such as a portable terminal device, for detecting azimuth and inclination angle of a device, the apparatus having an azimuth sensor for detecting geomagnetism components in a coordinate system fixed to the device and an acceleration sensor for detecting gravitational force components in the coordinate system fixed to the device and adapted to generate final detection values of the azimuth and the inclination angle of the device in a terrestrial coordinate system by use of the geomagnetism components and the gravitational force components, the apparatus further comprising: first computation means for performing coordinate conversion of the geomagnetism components by use of the gravitational force components to thereby obtain the azimuth and the inclination angle to be used as reference data; geomagnetism-depression-angle obtaining means for obtaining a geomagnetism depression angle, which is an angle formed between a horizontal plane and a direction of geomagnetism; second computation means for solving simultaneous equations of the azimuth and the inclination angle (in the terrestrial coordinate system), the simultaneous equations being obtained on the basis of the relation between the geomagnetism components in the coordinate system fixed to the device and the geomagnetism components in the terrestrial coordinate system and being specified by the geomagnetism depression angle, to thereby obtain at least one set of computed values of the azimuth and the inclination angle to be used as candidates of the azimuth and the inclination angle; and selection means, operable when a plurality of sets of computed values are obtained, for selecting one set of the computed values among the candidates by referring to the reference data, the selected one set of computed values being used as the final detection values of the azimuth and the inclination angle.

In this apparatus, it is preferable that the second computation means, when only one set of the computed values is obtained by solving the simultaneous equations, outputs the one set of computed values of the azimuth and the inclination angle as the final detection values of the azimuth and the inclination angle.

It is also preferable that the selection means selects one set of the computed values containing the inclination angle which is closer to the inclination angle of the reference data than any other inclination angle(s) contained in remaining set(s) of the computed values and outputs the selected set of the computed values as the final detection values of the azimuth and the inclination angle.

In this case, it is preferable that the geomagnetism-depression-angle obtaining means includes: geomagnetism-depression-angle computation means for calculating a value corresponding to the geomagnetism depression angle by performing coordinate conversion of the detected geomagnetism components by use of the detected gravitational force components; and averaging means for accumulating the value corresponding to the geomagnetism depression angle and averaging the accumulated values to store the averaged value for use as the geomagnetism depression angle.

With this configuration, reliable computation can be performed by making use of the actually measured value of the geomagnetism depression angle at the present location (the current position).

The averaging means may include date and time data storing means for obtaining data of date and time when the value corresponding to the geomagnetism depression angle is obtained by the geomagnetism-depression-angle computation means and for storing the obtained data of date and time together with the value corresponding to the geomagnetism depression angle into a table; and data selecting means for selecting the stored values each corresponding to the geomagnetism depression angle in the table used for obtaining the averaged value by eliminating the stored value corresponding to the geomagnetism depression angle which was stored at the timing which is prior to the current date and time by a predetermined amount of time or more.

Alternatively, the averaging means may include position data storing means for obtaining position data of the apparatus when the value corresponding to the geomagnetism depression angle is obtained by the geomagnetism-depression-angle computation means and for storing the obtained position data together with the value corresponding to the geomagnetism depression angle into a table; and data selecting means for selecting the stored values each corresponding to the geomagnetism depression angle in the table used for obtaining the averaged value by eliminating the stored value corresponding to the geomagnetism depression angle which was stored at a position apart from the current position of the apparatus by a predetermined distance or longer.

In another embodiment, the geomagnetism-depression-angle obtaining means may include position data obtaining means for obtaining at least current latitude of the apparatus as current position data; and geomagnetism-depression-angle generation means for generating the geomagnetism depression angle from the current position data.

With this configuration, the geomagnetism depression angle can be obtained as a value which is not affected at all by errors stemming from the measured gravitational force components, whereby the detection accuracy can be improved.

The present invention also provides a method of detecting azimuth and inclination angle of a device in which geomagnetism components in a coordinate system fixed to the device and gravitational force components in the coordinate system fixed to the device are detected and final detection values of the azimuth and the inclination angle of the device in a terrestrial coordinate system are generated by use of the geomagnetism components and the gravitational force components, the method comprising steps of: performing coordinate conversion of the geomagnetism components by use of the gravitational force components to thereby compute the azimuth and the inclination angle, and storing the computed azimuth and inclination angle as reference data; obtaining a geomagnetism depression angle, which is an angle formed between a horizontal plane and a direction of geomagnetism; solving simultaneous equations of the azimuth and the inclination angle, the simultaneous equations being obtained on the basis of the relation between the geomagnetism components in the coordinate system fixed to the device and the geomagnetism components in the terrestrial coordinate system and being specified by the geomagnetism depression angle, to thereby obtain at least one set of computed values of the azimuth and the inclination angle to be used as candidates of the azimuth and the inclination angle; and selecting, when a plurality of sets of computed values are obtained, one set of computed values among the candidates by referring to the reference data, the selected one set of computed values being used as the final detection values of the azimuth and the inclination angle.

The present invention further provides a program for causing a computer to perform the steps of: detecting geomagnetism components in a coordinate system fixed to a device; detecting gravitational force components in the coordinate system fixed to the device; performing coordinate conversion of the geomagnetism components by use of the gravitational force components to thereby compute the azimuth and the inclination angle, and storing the computed azimuth and inclination angle as reference data; obtaining a geomagnetism depression angle, which is an angle formed between a horizontal plane and a direction of geomagnetism; solving simultaneous equations of the azimuth and the inclination angle, the simultaneous equations being obtained on the basis of the relation between the geomagnetism components in the coordinate system fixed to the device and the geomagnetism components in the terrestrial coordinate system and being specified by the geomagnetism depression angle, to thereby obtain at least one set of computed values of the azimuth and the inclination angle to be used as candidates of the azimuth and the inclination angle; and selecting, when a plurality of sets of computed values are obtained, one set of computed values among the candidates by referring to the reference data, the selected one set of computed values being used as final detection values of the azimuth and the inclination angle.

According to the present invention, since the azimuth and the inclination angle are obtained by solving simultaneous equations of the azimuth and the inclination angle defined (or specified) by the geomagnetism components, the final detection values which are not affected by errors of the gravitational force components can be obtained, whereby the detection accuracy is improved. In addition, the azimuth and the inclination angle are calculated from the geomagnetism components and the gravitational force components to be stored and used as reference data, and when a plurality of solutions exist, one solution is selected by making use of the reference data. This solves the problem which may arise when the simultaneous equations have a plurality of solutions. Because of the above-described advantages, the present invention can be effectively applied to a portable azimuth/inclination-angle detection device, particularly to an azimuth/inclination-angle detection device incorporated into a portable terminal device such as a cellular phone.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 7 is an example of a geomagnetism depression angle table for storing (or accumulating) geomagnetism depression angles $\theta 0$.

FIG. 8 is another example of a geomagnetism depression angle table for storing (or accumulating) geomagnetism depression angles $\theta 0$.

DESCRIPTION OF THE PREFERRED EMBODIMENT

An embodiment of the present invention will be described with reference to the drawings.

Figure 1:
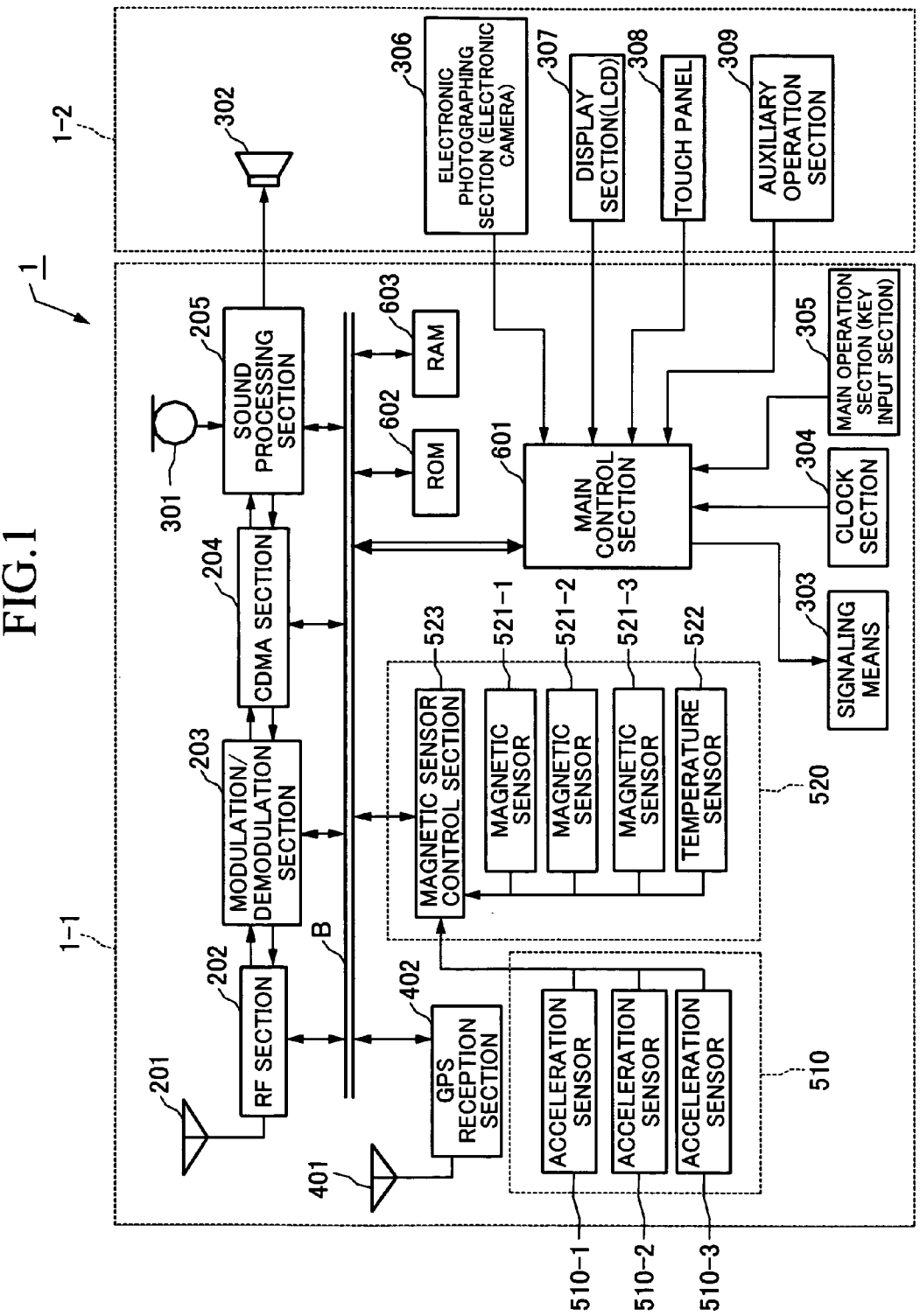
FIG. 1 is a block diagram showing the configuration of a cellular phone according to one embodiment of the present invention.

FIG. 1 is a block diagram showing the configuration of a cellular phone 1 according to the present embodiment.

As shown in FIG. 1, the cellular phone 1 is a foldable portable terminal device including two terminal units (housings) 1-1 and 1-2. An antenna 201 is used for sending radio wave signals to an unillustrated radio base station and receiving radio wave signals therefrom. An RF (radio frequency) section 202 converts signals received by the antenna 201 to reception signals of an intermediate frequency, and outputs them to a modulation-demodulation section 203. Further, the RF section 202 converts transmission signals sent from the modulation-demodulation section 203 to signals of a transmission frequency, and outputs them to the antenna 201 for transmission thereof.

The modulation-demodulation section 203 performs processing for demodulating reception signals sent from the RF section 202 and processing for modulating transmission signals sent from a CDMA (code division multiple access) section 204. The CDMA section 204 performs processing for coding transmission signals and processing for decoding reception signals. A sound processing section 205 converts sound signals sent from a microphone 301 to digital signals and outputs them to the CDMA section 204. Further, the sound processing section 205 receives digital sound signals from the CDMA section 204, converts them to analog sound signals, and outputs the analog sound signals to a speaker 302 to produce sounds.

An antenna 401 is used for receiving radio wave signals from GPS (global positioning system) satellites. A GPS reception section 402 demodulates radio wave signals sent from the GPS satellites and calculates the position represented with latitude and longitude (and optionally altitude in the case of a three-dimensional mode) of the cellular phone 1 on the basis of the radio wave signals.

Figure 2:
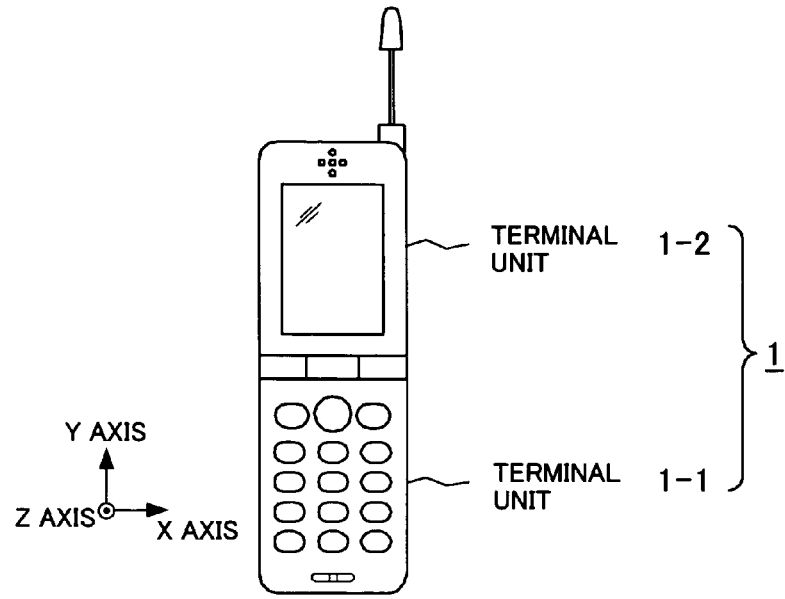
FIG. 2 is a front view of the cellular phone with the terminal units opened.

An acceleration sensor section 510 detects acceleration of the terminal unit 1-1. The circuit components of the acceleration sensor section 510 are assembled in a single package and integrated into a single chip. FIG. 2 shows a front view of the cellular phone 1 with the first and second terminal units 1-1 and 1-2 opened. The cellular phone 1 has three axes; X, Y, and Z axes. The Y axis is parallel to side surfaces of the first terminal unit 1-1. The positive direction of the Y axis is a direction from the first terminal to the second terminal unit 1-2. The X axis is located on the surface of the first terminal unit 1-1, and extends perpendicular to the Y axis. The Z axis is perpendicular to a plane which include X axis and Y axis. The positive direction of the Z axis is a direction from the back side of the sheet of FIG. 2 toward the front side thereof. Referring back to FIG. 1, the acceleration detected by the acceleration sensor section 510 is used for detecting motion and inclination of the terminal unit 1—1.

A magnetic sensor section 520 includes magnetic sensors 521-1 to 521-3, a temperature sensor 522, and a magnetic sensor control section 523, which are assembled in a single package and integrated into a single chip. The magnetic sensors 521-1 to 521-3 detect magnetism (magnetic field) in the X, Y, and Z axes, which perpendicularly intersect with respect to one another, respectively, and output them in the form of magnetic field data. Here, the magnetic sensors 521-1 to 521-3 are adjusted such that the X, Y, and Z axes coincide with those associated with the acceleration sensors. The temperature sensor 522 detects ambient temperature so as to perform temperature compensation for the magnetic sensors 521-1 to 521-3. The magnetic sensor control section 523 performs predetermined data processing for the detection outputs of the magnetic sensors 521-1 to 521-3, the temperature sensor 522, and the acceleration sensor section 510, and outputs resultant data.

A main control section 601 performs main control of the cellular phone 1, and is composed of a CPU (central processing unit). A ROM (read only memory) 602 and a RAM (random access memory) 603 serve as a main memory of the CPU. The ROM 602 stores programs to be executed by the CPU and various data. The RAM 603 provides a work region which the CPU uses to store data or the like in the course of its operation.

A signaling means 303 includes a speaker, a vibrator, a light-emitting diode, or the like, and informs an incoming call, reception of a mail, etc., to a user by means of sound, vibration, light, or the like. A clock section 304 is a clock function section used by the main control section 601. A main operation section 305 receives instructions input by the user and feeds them to the main control section 601.

An electronic photographing section 306 converts an image of an object to a digital signal, and outputs it to the main control section 601. A display section 307 includes a liquid crystal display (LCD) for displaying images, characters, etc. on the basis of display signals sent from the main control section 601. A touch panel 308 is built into the surface of the liquid crystal display of the display section 307, and outputs to the main control section 601 a signal indicating an instruction, data, etc., which is input by the user through touching operation. An auxiliary operation section 309 is a push switch used for display changeover.

In the cellular phone 1 having the above-described configuration, the CPU of the main control section 601 starts a main program (upper level program) read from the ROM 602, and selectively executes various applications with using the main program. When an executed application program requires azimuth data or inclination data, a measurement trigger is produced upon execution of this application program. In response to this measurement trigger, the main control section 601 starts processing for detecting azimuth and inclination angle of the center axis of the cellular phone 1 to thereby obtain an azimuth angle $\alpha$ and an elevation angle $\beta$ in the terrestrial coordinate system. The azimuth angle $\alpha$ represents the azimuth in the terrestrial coordinate system. The elevation angle $\beta$ represents the inclination angle of the center axis of the cellular phone 1 in the terrestrial coordinate system.

Figure 3:
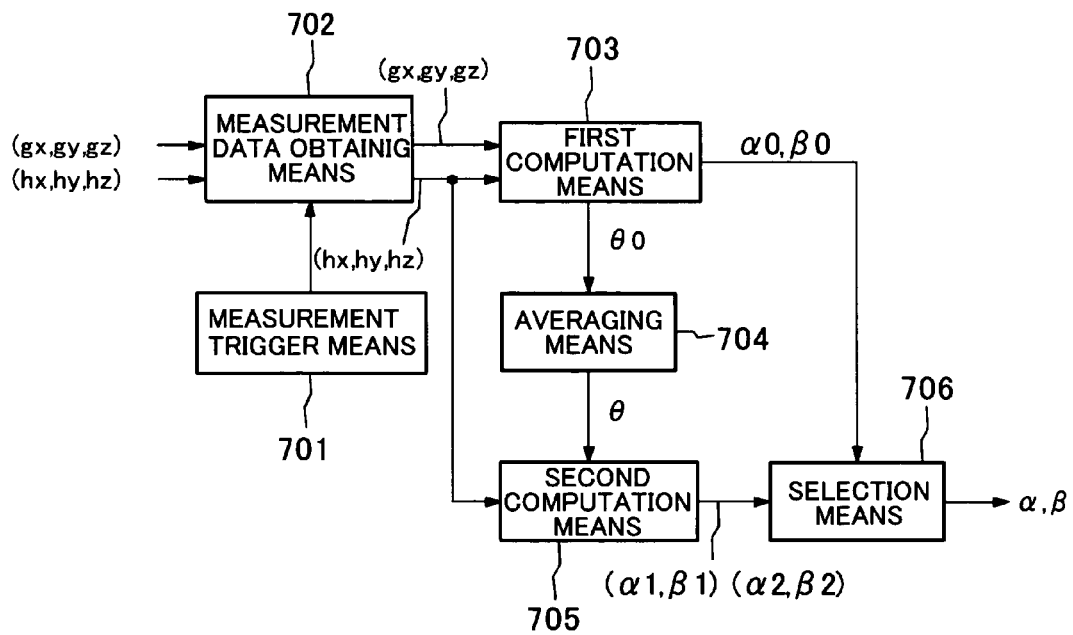
FIG. 3 is a block diagram showing functions realized by azimuth and inclination-angle detection processing.

FIG. 3 is a block diagram showing functions realized by the above processing for detecting azimuth and inclination angle. As shown in FIG. 3, measurement trigger means 701 generates a measurement instruction. Measurement-data obtaining means 702 obtains measurement data sets g and h from the acceleration sensor section 510 and the magnetic sensor section 520. First azimuth/inclination angle computation means 703 performs a first computation described later, to thereby obtain azimuth angle $\alpha$, elevation angle $\beta$, twist angle $\gamma$, and geomagnetism depression angle $\theta$ from the measurement data sets g and h. The azimuth angle $\alpha$, the elevation angle $\beta$, etc. will be described in later detail. Notably, the azimuth angle $\alpha$ and the elevation angle $\beta$ calculated through the first computation are handled (treated) as reference values $\alpha 0$ and $\beta 0$, respectively, and the geomagnetism depression angle $\theta$ calculated through the first computation is handled (treated) as a rough value $\theta 0$ involving an error. Averaging means 704 accumulates rough values $\theta 0$ of the geomagnetism depression angle, and averages them so as to eliminate the error, to thereby obtain an accurate value of the geomagnetism depression angle $\theta$.

Second azimuth/inclination angle computation means 705 performs a second computation described later, to thereby obtain azimuth angle $\alpha$ and elevation angle $\beta$ from the measurement data set h and the geomagnetism depression angle $\theta$ (obtained by the averaging means 704). In the case where a plurality of solutions exist for the values of azimuth angle $\alpha$ and elevation angle $\beta$ as a result of the second computation, the second azimuth/inclination angle computation means 705 outputs the respective solutions as candidate values $(\alpha 1, \beta 1)$ and $(\alpha 2, \beta 2)$, etc. Selection means 706 selects single values from the candidate values $(\alpha 1, \beta 1)$ and $(\alpha 2, \beta 2)$ and so on with reference to (i.e. by referring to) the reference values ($\alpha 0$, $\beta 0$) obtained by the first azimuth/inclination angle computation means 703, and outputs the selected values as final detection values ($\alpha$, $\beta$).

Figure 4:
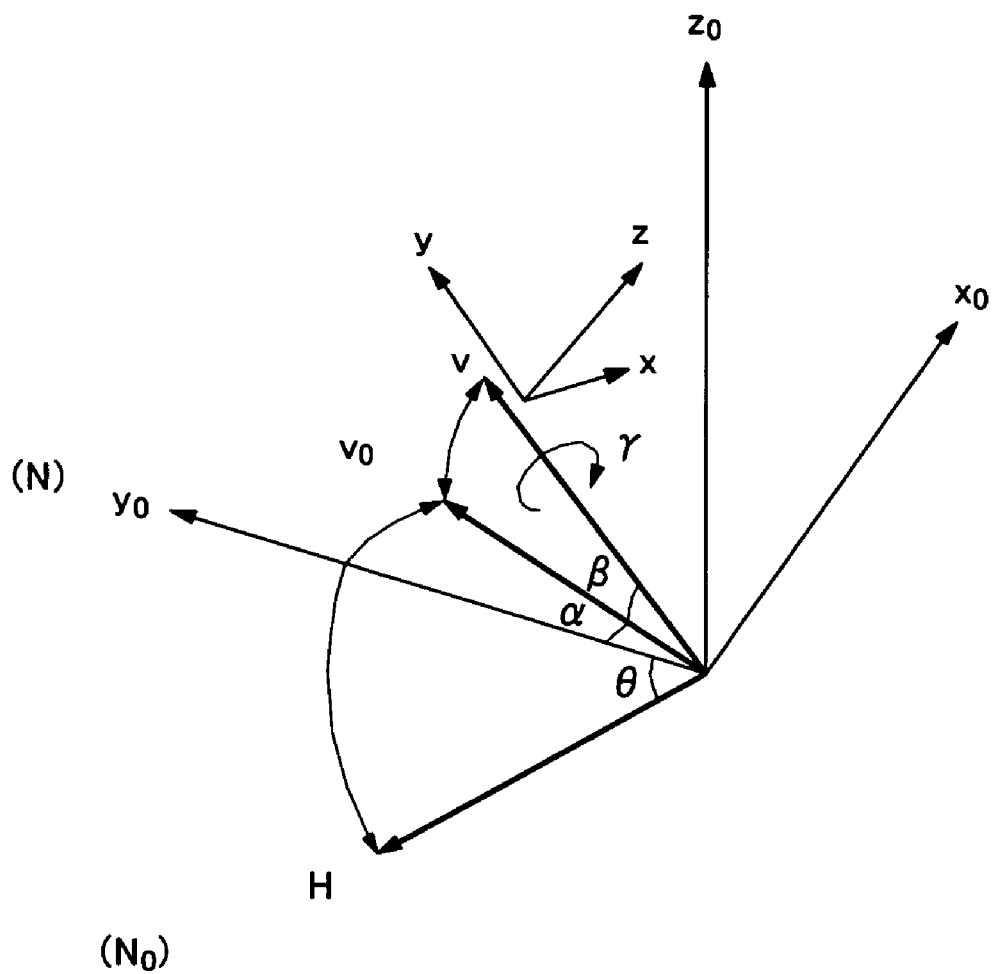
FIG. 4 is a diagram showing data used in first and second computations and their coordinate systems.

FIG. 4 is a diagram showing data used in the first and second computations and their coordinate systems. In FIG. 4, x, y, and z axes are orthogonal coordinate axes set on the cellular phone (see FIG. 2), x0, y0, and z0 axes are orthogonal coordinate axes, the x0 and y0 axes being located on a horizontal plane, and the y0 axis being directed in the direction of magnetic north N. The z0 axis extends upward from the horizontal plane along a direction perpendicular to the horizontal plane (that is, the positive direction of the z0 axis is in a direction extending upward from the horizontal plane and perpendicular to the horizontal plane). Hereinafter, the coordinate system represented by the x0, y0, and z0 axes will be referred to as the "terrestrial coordinate system". A vector V represents the orientation of the center axis of the cellular phone 1, and thus is parallel to the y axis. A vector V0 is a projection vector obtained by projecting the vector V on the x0-y0 plane (horizontal plane) from the upper side with respect to the z0 axis, and thus is a vector on the x0-y0 plane. The azimuth angle $\alpha$ corresponds to the angle formed between the y0 axis and the vector V0. The elevation angle $\beta$ corresponds to the angle formed between the vector V0 and the vector V. The azimuth angle $\alpha$ and the elevation angle $\beta$ determine the direction of the vector V. The twist angle $\gamma$ is an angle at which the x-y plane is rotated about the y axis, and thus corresponds to the intersection angle between the y-z0 plane and the y-z plane. A vector H represents the direction of geomagnetism, and is directed to the magnetic north N0. A geomagnetism depression angle $\theta$ is an angle formed between the horizontal plane and the direction of geomagnetism, and thus corresponds to an angle formed between the y0 axis (magnetic north direction N) and the vector H (magnetic north N0).

Figure 5:
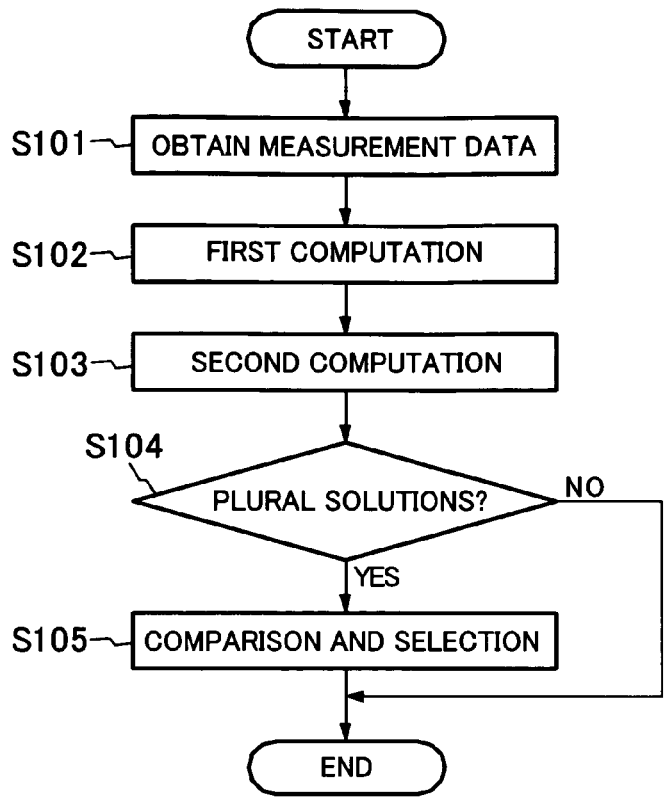
FIG. 5 is a flowchart schematically showing the azimuth and inclination-angle detection processing.

FIG. 5 is a flowchart schematically showing the processing for detection of azimuth and inclination angle. Referring to FIG. 5 in combination with FIG. 1, the main control section 601 obtains a detected gravitational force g from the acceleration sensor section 510 and obtains a detected geomagnetism h from the magnetic sensor section 520 (S101). As shown in Eq. 1, the detected gravitational force g is obtained in the form of gravitational force components (gx, gy, gz) in the coordinate system on the cellular phone 1 (the x, y, z coordinate system). Here, gx, gy, and gz correspond to the detection outputs of the acceleration sensors 510-1 to 510-3, respectively.

$$g = (gx, gy, gz) \qquad \text{Eq. 1}$$

The main control section 601 firstly performs the first computation by use of the obtained detected gravitational force g and detected geomagnetism h (S102). In this first computation, the main control section 601 performs a first angle computation so as to calculate the elevation angle $\beta$ and the twist angle $\gamma$ from (on the basis of) the detected gravitational force g, and then performs a second angle computation so as to calculate the azimuth angle $\alpha$ from (on the basis of) the detected gravitational force g, the calculated elevation angle $\beta$, and the calculated twist angle $\gamma$.

Prior to explanation of the first angle computation, the relation between the detected gravitational force g and the gravitational force G in the terrestrial coordinate system will be described. The gravitational force G in the terrestrial coordinate system can be represented by (Gx0, Gy0, Gz0). Since Gx0=0 and Gy0=0, the gravitational force G can be represented as shown in Eq. 2. Notably, Gx0, Gy0, and Gz0 are gravitational force components along the above-described x0, y0, and z0 axes, respectively.

$$G = (0, 0, Gz_0) \qquad \text{Eq. 2}$$

The relation between the gravitational force G and the detected gravitational force g can be represented by the following Eq. 3.

$$(Gx_0, Gy_0, Gz_0)BC = (gx, gy, gz) \qquad \text{Eq. 3}$$

In Eq. 3, B is a transformation formula for rotational transformation by the elevation angle $\beta$, and is represented by the matrix shown in Eq. 4.

$$B = \begin{bmatrix} 1 & 0 & 0 \\ 0 & \cos\beta & \sin\beta \\ 0 & -\sin\beta & \cos\beta \end{bmatrix} \qquad \text{Eq. 4}$$

In Eq. 3, C is a transformation formula for rotational transformation by the twist angle $\gamma$, and is represented by the matrix shown in Eq. 5.

$$C = \begin{bmatrix} \cos\gamma & 0 & -\sin\gamma \\ 0 & 1 & 0 \\ \sin\gamma & 0 & \cos\gamma \end{bmatrix} \qquad \text{Eq. 5}$$

According to Eqs. 4 and 5, the composite transformation formula BC for rotational transformation by the elevation angle $\beta$ and the twist angle $\gamma$ is represented by the matrix shown in Eq. 6.

$$BC = \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix} \qquad \text{Eq. 6}$$

When Eq. 6 and Eq. 2 are substituted in Eq. 3 and the resultant equation is simplified, the following Eq. 7 can be obtained.

$$(gx, gy, gz) = (0, 0, Gz_0) \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix} \qquad \text{Eq. 7}$$

$$= Gz_0(\cos\beta\sin\gamma, -\sin\beta, \cos\beta\cos\gamma)$$

When Eq. 7 is simplified, the relation between the elevation angle $\beta$ and the gravitational force components gx, gy, and gz is determined as shown in the following Eq. 8.

$$\beta = \arctan\left(-\frac{gy}{\sqrt{gx^2 + gz^2}}\right) \qquad \text{Eq. 8}$$

Further, the relation between the twist angle $\gamma$ and the gravitational force components gx, gy, and gz is determined as shown in the following Eq. 9.

$$\gamma = \begin{cases} \arctan\left(\dfrac{gx}{gz}\right) & gz \geq 0 \\ 180(\deg) + \arctan\left(\dfrac{gx}{gz}\right) & gz < 0 \end{cases} \qquad \text{Eq. 9}$$

In the first angle computation, the elevation angle β and the twist angle γ are computed (or calculated) based on the gravitational force components gx, gy, and gz by use of the relations of Eqs. 8 and 9.

Next, the second angle computation will be described. Here, the detected geomagnetism h is obtained in the form of geomagnetism components hx, hy, and hz in the coordinate system on the cellular phone 1 (x, y, z coordinate system) as shown in the following Eq. 10. Notably, hx, hy, and hz correspond to the detection outputs of the magnetic sensors 521-1 to 521-3, respectively.

$$h = (hx, hy, hz) \qquad \text{Eq. 10}$$

The geomagnetism H in the terrestrial coordinate system (x0, y0, z0 coordinate system) can be represented by (Hx0, Hy0, Hz0). Since Hx0=0, the geomagnetism H can be represented as shown in Eq. 11. Notably, Hx0, Hy0, and Hz0 are geomagnetism components along the above-described x0, y0, and z0 axes, respectively.

$$H = (0, Hy_0, Hz_0) \qquad \text{Eq. 11}$$

The relation between the geomagnetism H and the detected geomagnetism h can be presented by the following Eq. 12.

$$(0, Hy_0, Hz_0)ABC = (hx, hy, hz) \qquad \text{Eq. 12}$$

In Eq. 12, A is a transformation formula for rotational transformation by the azimuth angle α, and is represented by the matrix shown in Eq. 13.

$$A = \begin{bmatrix} \cos\alpha & \sin\alpha & 0 \\ -\sin\alpha & \cos\alpha & 0 \\ 0 & 0 & 1 \end{bmatrix} \qquad \text{Eq. 13}$$

The following Eq. 14 is obtained through modification of Eq. 12. Eq. 14 is an identity of (hx1, hy1, hz1). Here, hx1, hy1, and hz1 represent geomagnetism components along the x1, y1, and z1 axes (not shown) obtained through rotational transformation of the x0, y0, and z0 axes by the azimuth angle α about the z0 axis.

$$(0, Hy_0, Hz_0)A = (hx, hy, hz)C^{-1}B^{-1} \equiv (hx_1, hy_1, hz_1) \qquad \text{Eq. 14}$$

The following Eq. 15 is obtained from Eq. 14.

$$(hx_1, hy_1, hz_1) = (-Hy_0 \sin\alpha, Hy_0 \cos\alpha, Hz_0) \qquad \text{Eq. 15}$$

The relation between the azimuth angle α and the geomagnetism components hx1 and hy1 is obtained from Eq. 15 as shown by the following Eq. 16.

$$\alpha = \begin{cases} \arctan(-hx_1/hy_1) & |hy_1| > |hx_1|, \ hy_1 > 0 \\ 90(\deg) - \arctan(-hy_1/hx_1) & |hy_1| < |hx_1|, \ hx_1 > 0 \\ 180(\deg) + \arctan(-hx_1/hy_1) & |hy_1| > |hx_1|, \ hy_1 < 0 \\ 270(\deg) - \arctan(-hy_1/hx_1) & |hy_1| < |hx_1|, \ hx_1 < 0 \end{cases} \qquad \text{Eq. 16}$$

Similarly, the relation between the geomagnetism depression angle θ and the geomagnetism components hx1, hy1, and hz1 can be presented by the following Eq. 17.

$$\theta = \arctan\dfrac{hz_1}{\sqrt{hx_1^2 + hy_1^2}} \qquad \text{Eq. 17}$$

In the second angle computation, the azimuth angle α is computed from the geomagnetism components hx, hy, and hz by use of the relations of Eqs. 14 and 16.

In this manner, the main control section 601 obtains the azimuth angle α and the elevation angle β by performing the first and second angle computations. However, the azimuth angle α thus obtained and the elevation angle β thus obtained are values which are calculated on the basis of the detected gravitational force g, and therefore, they are low in accuracy because of influence of errors produced as a result of movement of the cellular phone 1. Accordingly, the main control section 601 stores the thus-obtained azimuth angle α and elevation angle β as reference values (α0, β0), and ends step S102. Notably, in the case where the calculated twist angle γ falls within the range of −10 degree to +10 degrees, the values (α0, β0) may be stored as final detection values, and step S102 and subsequent steps may be omitted.

Next, the main control section 601 performs the second computation (S103). In this second computation, the main control section 601 obtains the azimuth angle α and the elevation angle β from the detected geomagnetism h obtained in step S101 and the separately obtained geomagnetism depression angle θ.

Prior to explanation of the second computation, the horizontal component Hy0 and the vertical component Hz0 of the geomagnetism H can be represented by the following Eq. 18 by use of the geomagnetic intensity Hg and the geomagnetism depression angle θ.

$$H = (0, Hy_0, Hz_0) = Hg(0, \cos\theta, \sin\theta) \qquad \text{Eq. 18}$$

The relation between the geomagnetism H and the detected geomagnetism h can be represented by the following Eq. 19.

$$(0, Hy_0, Hz_0)AB = (hx, hy, hz) \qquad \text{Eq. 19}$$

In Eq. 19, AB is a composite transformation formula for conversion between the x, y, z coordinate system and the x0, y0, z0 coordinate system, and is represented by the matrix of Eq. 20, which is obtained from Eqs. 4 and 13.

$$AB = \begin{bmatrix} \cos\alpha & \sin\alpha\cos\beta & \sin\alpha\sin\beta \\ -\sin\alpha & \cos\alpha\cos\beta & \cos\alpha\sin\beta \\ 0 & -\sin\beta & \cos\beta \end{bmatrix} \qquad \text{Eq. 20}$$

The following Eq. 21 is derived from Eqs. 18 and 19.

$$Hg(0, \cos\theta, \sin\theta)AB = (hx, hy, hz) \qquad \text{Eq. 21}$$

That is, when the geomagnetism depression angle θ and the geomagnetism components hx, hy, and hz are given, simultaneous equations of the azimuth angle α and the elevation angle β can be obtained from Eqs. 20 and 21.

In the second computation, the main control section 601 utilizes the simultaneous equations of the azimuth angle α and the elevation angle β using the geomagnetism depression angle θ (obtained at step 202) and the geomagnetism components hx, hy, and hz (obtained at S201) to obtain (calculate) the azimuth angle α and the elevation angle β by solving the simultaneous equations. However, solutions of the simultaneous equations are not necessarily unique, and in some cases, two or more sets of solutions are obtained.

When two or more sets of solutions are obtained, the main control section 601 stores the solutions as candidate values (α1, β1), (α2, β2) and soon to end the step S103. When the result of the second computation shows that only one set of solutions is obtained (S104: No), the solutions are stored as detection values α and β (i.e., final detection values α and β to be output), and the operation ends. When two or more sets of solutions are obtained (S104: Yes), the main control section 601 performs comparison and selection processing (S105).

In this comparison and selection processing, the main control section 601 compares the above-described reference values (α0, β0) and the candidate values (α1, β1), (α2, β2) and so on, and it selects one set of candidate values containing an elevation angle which is closer to the elevation angle β0 of the reference values than an elevation angle contained in the other set(s). That is, the selected values contain the elevation angle which is closest to the elevation angle β0 of the reference values among the other elevation angle(s) of the candidate values. The main control section 601 stores the thus selected candidate value set as detection values (α, β) (i.e., the final detection values α and β to be output). Since the thus obtained-values α and β (through the second computation) are based on the geomagnetism depression angle θ and the geomagnetism components hx, hy, and hz, they do not involve errors stemming from movement of the cellular phone 1. Accordingly, the thus-obtained (detection) values α and β are highly accurate.

Next, processing for obtaining the geomagnetism depression angle θ will be described.

Figure 6:
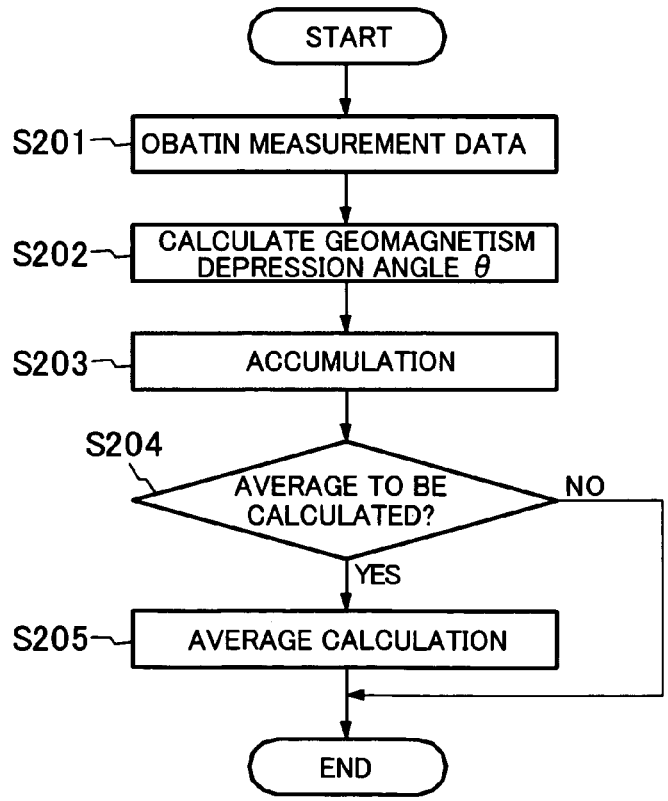
FIG. 6 is a flowchart showing an example of processing for acquiring geomagnetism depression angle.

FIG. 6 is a flowchart showing an example of processing for obtaining the geomagnetism depression angle θ. The processing will be described with reference to FIGS. 1 and 6. The main control section 601 starts the processing for obtaining the geomagnetism depression angle θ in response to a trigger which is appropriately set. In this processing, as in the above-described processing for detecting azimuth and inclination angle, the main control section 601 obtains the detected gravitational force g from the acceleration sensor section 510 and obtains the detected geomagnetism h from the magnetic sensor section 520 (S201). Subsequently, the main control section 601 obtains the geomagnetism depression angle θ from (on the basis of) the gravitational force components gx, gy, and gz and the geomagnetism components hx, hy, and hz, by use of the relations represented by Eqs. 8 and 9 as well as the relations represented by Eqs. 14 and 17 (S202). This step corresponds to geomagnetism-depression-angle computation means for calculating a value corresponding to the geomagnetism depression angle θ by performing coordinate conversion of the detected geomagnetism components h by use of the detected gravitational force components g. The main control section 601 stores and keeps (or accumulates) the obtained geomagnetism depression angle θ as a rough value θ0 of the geomagnetism depression angle, which value involves errors stemming from the acceleration sensors 510-1 to 510-3 (S203).

After that, the main control section 601 performs average calculation processing (S205) in response to a trigger generated when, for instance, the data of value θ0 is accumulated by a predetermined amount (that is, an amount of the data of value θ0 becomes equal to a predetermined amount) (S204). In this average calculation processing, the main control section 601 calculates the mean value of the accumulated (stored) values θ0 of the geomagnetism depression angle so as to eliminate errors stemming from the acceleration sensors 510-1 to 510-3 caused by movement of the cellular phone 1 (S205) in order to obtain the geomagnetism depression angle θ to be used at the step of S103 described before. The steps of S203, S204 and S205 corresponds to averaging means for accumulating the value corresponding to the geomagnetism depression angle and averaging the accumulated values to store the averaged value for use as the geomagnetism depression angle.

At this time, the main control section 601 may select only the values θ0 within a predetermined deviation range with respect to the current average value θ, and use only the selected values θ0 as data to undergo the average calculation (e.g., the main control section 601 may calculate a new average value θ based on the thus-selected values θ0). In this case, values θ0 involving significant errors stemming from the acceleration sensors 510-1 to 510-3 can be eliminated, so that a more accurate value of the geomagnetism depression angle θ can be obtained.

One of examples for accumulating (or storing) the geomagnetism depression angle θ (the rough value θ0) is described, hereinafter. When the main control section 601 stores the obtained geomagnetism depression angle θ as a rough value θ0, it simultaneously obtains data representing current date and time (data of date and time) from the clock section 304 and stores the obtained data of date and time together with the value θ0 into a table (a geomagnetism depression angle table). This operation corresponds to date and time data storing means for obtaining data of date and time when the value corresponding to the geomagnetism depression angle is obtained by the geomagnetism-depression-angle computation means and for storing the obtained data of date and time together with the value corresponding to the geomagnetism depression angle into a table.

FIG. 7 shows an example of the geomagnetism depression angle table for storing (or accumulating) the geomagnetism depression angle θ0 and the data of date and time. When the number of the data stored in the geomagnetism depression angle table reaches a predetermined number n, the main control section 601 again obtains data representing current date and time (date and time of the present timing) from the clock section 304.

Subsequently, the main control section 601 compares data representing current date and time with the data of date and time stored together with the value θ0 in the geomagnetism depression angle table to determine whether or not the geomagnetism depression angle table contains data (i.e., the value θ0) stored at the timing which is prior to the current date and time by a predetermined amount of time or more. If there is no data (i.e., the value θ0) stored at the timing which is prior to the current date and time by the predetermined amount of time or more in the table, the main control section 601 performs the average calculation processing of step S205.

On the other hand, if there is data (i.e., the value θ0) stored at the timing which is prior to the current date and time by the predetermined amount of time or more in the table, the main control section 601 deletes (or eliminates) such data including the value θ0 from the table, and then returns to step S201 to continue to obtain the data.

It should be noted that the above described processing may be referred to as the "determination processing for selecting data". The determination processing for selecting data corresponds to data selecting means for selecting the stored values corresponding to the geomagnetism depression angle in the table used for obtaining (or calculating) the averaged value by eliminating the stored value corresponding to the geomagnetism depression angle which was stored at the timing which is prior to the current date and time by a predetermined amount of time or more.

It should also be noted that the main control section 601 does not clear (or delete) the selected data stored in the geomagnetism depression angle table when performing the average calculation processing of step S205, and can thereby validly utilize the geomagnetism depression angle θ0 obtained in the past. Further, the main control section 601 can utilize only the data including the value θ0 stored within the predetermined amount of time from the current date and time, by performing the determination processing for selecting data in which the main control section 601 uses the above-described data of date and time. Thus, accuracy of the geomagnetism depression angle θ can be improved.

Another example for accumulating (or storing) the geomagnetism depression angle θ (the rough value θ0) is described, hereinafter.

The main control section 601 may obtain current position data (latitude and longitude, or φ and λ) from the GPS reception section 402 and store the currently obtained geomagnetism depression angle θ as a rough value θ0 together with the current position data (and more preferably, together with the data of current date and time) into the geomagnetism depression angle table. This operation corresponds to position data storing means for obtaining position data when the value corresponding to the geomagnetism depression angle is obtained by the geomagnetism-depression-angle computation means and for storing the obtained position data together with the value corresponding to the geomagnetism depression angle into a table.

In this example, as the way of the determination processing for selecting data described above, the main control section 601 obtains current position data and compares the current position data with the position data stored together with the value θ0 in the geomagnetism depression angle table to delete the data including the value θ0 from the geomagnetism depression angle table (or not to utilize such data in the average calculation processing of step S205), the data indicating that the value θ0 corresponding to the data was stored at a position apart from the current position by a predetermined distance or longer. This operation corresponds to data selecting means for selecting the stored values corresponding to the geomagnetism depression angle in the table used for obtaining the averaged value by eliminating the stored value corresponding to the geomagnetism depression angle which was stored at a position apart from the current position by a predetermined distance or longer. FIG. 8 shows an example of the geomagnetism depression angle table for storing (or accumulating) the geomagnetism depression angle θ0 and the position data together with the data of date and time.

Next, another processing for obtaining the geomagnetism depression angle θ will be described with reference to FIG. 1.

The main control section 601 performs the processing for obtaining the geomagnetism depression angle θ, for example, at the beginning of step S103 (see FIG. 5) of the processing for detecting azimuth and inclination angle. In this obtaining processing, the main control section 601 firstly obtains current position data φ and λ from the GPS receiver 402. Notably, φ represents the latitude and λ represent the longitude. The main control section 601 then computes the geomagnetism depression angle θ from the position data φ and λ by use of the following Eq. 22.

$$\theta = 51°03'.804 + 73'.745\Delta\phi - 9'.472\Delta\lambda - 0'.771\Delta\phi^2 - 0'.459\Delta\phi\Delta\lambda + 0'.359\Delta\lambda^2 \qquad \text{Eq. 22}$$

Notably, this equation is for the year 2000, and Δφ and Δλ can be obtained as follows:

$$\Delta\phi = \phi - 37° N$$

$$\Delta\lambda = \lambda - 138° E.$$

Eq. 22 is an approximated quadratic equation for representing distribution of geomagnetism depression angle θ with respect to the latitude and the longitude. Since the coefficients of the terms of Eq. 22 change with movement of the magnetic poles, accuracy is maintained through, for example, updating at regular intervals, such as once a year. For instance, data of the coefficients can be downloaded to portable terminal device (or the cellular phone 1) from a server for the update. Further, depending on the accuracy required for obtaining the geomagnetism depression angle θ, the third and subsequent terms of Eq. 22 may be omitted; i.e., there may be used an approximated linear equation for representing the geomagnetism depression angle θ by the longitude φ.

Alternatively, it is preferable that a conversion table for converting the position data φ and λ to the geomagnetism depression angle θ be previously prepared on the basis of Eq. 22 and stored in the ROM 602, and the main control section 601 obtain the geomagnetism depression angle θ based on the obtained position data φ and λ with reference to the conversion table. In this case, since the main control section 601 can obtain the geomagnetism depression angle θ without use of the detected gravitational force g from the magnetic sensor section 520, the main control section 601 can perform accurate computation which does not involve errors stemming from the acceleration sensors 510-1 to 510-3. Further, with this configuration, the geomagnetism depression angle θ can be obtained through simple computation.

Various embodiments of the present invention have been described in detail above. However, the present invention is not limited to the embodiments, and the present invention may include modifications without departing from the scope of the present invention. For example, in the case where the present invention is applied to a cellular phone or a like device which has a function of communicating with a relay station, a server, or the like, the relay station, the server, or the like may be designed to have a function of sending the position data φ and λ or the geomagnetism depression angle θ and send the data to the cellular phone in response to a request from the cellular phone. This configuration is advantageous in that each terminal (i.e., each of the cellular phone) can obtain accurate values of the geomagnetism depression angle θ particularly in the narrow band radio communication system such as PHS (Personal Handyphone System (registered trademark)).

In the above-described embodiment, the main control section 601 is a control section using a CPU. However, the main control section 601 may be formed by use of a BBP (base band processor) or a combination of a BBP (as a main processor) and a DSP (digital signal processor; as a sub processor) which performs modulation and demodulation of communication signals and the like.

Programs to be incorporated into the BBP and/or the DSP may be recorded on a computer-readable recording medium for distribution. The programs may be distributed in a form which realizes a portion of the above-described functions. For example, the program may be distributed in the form of application software which utilizes the basic functions provided by an operation system (OS). Moreover, the program may be distributed in the form of a so-called differential program which realizes predetermined functions through combination with programs of existing systems already stored in computer systems.

The term "computer-readable recording medium" encompasses not only recording media such as transportable magnetic disks and magneto-optical disks, but also storage apparatuses such as hard disk drives and other nonvolatile storage apparatuses. Moreover, the above-mentioned programs may be provided from other computer systems via an arbitrary transmission medium such as the Internet or other types of networks. In this case, the term "computer-readable recording medium" encompasses a device which holds programs on the transmission medium for a certain period of time; such as a volatile memory in a computer system which serves as a host or a client on a network.

The configuration in which the control section is formed by a co-processor scheme by use of a BBP and/or a DSP has been described; however, it may be the case that at least a portion of the processors are formed by hardware circuits such as FPGA (field programmable gate alley). As in the case of the above-described programs, data of circuit programs to be incorporated into the FPGA can be distributed in various manners.

What is claimed is:

1. An apparatus for detecting azimuth and inclination angle of a device, the apparatus having an azimuth sensor for detecting geomagnetism components in a coordinate system fixed to the device and an acceleration sensor for detecting gravitational force components in the coordinate system fixed to the device and adapted to generate final detection values of the azimuth and the inclination angle of the device in a terrestrial coordinate system by use of the geomagnetism components and the gravitational force components, the apparatus further comprising:

first computation means for performing coordinate conversion of the geomagnetism components by use of the gravitational force components to thereby obtain the azimuth and the inclination angle to be used as reference data;

geomagnetism-depression-angle obtaining means for obtaining a geomagnetism depression angle, which is an angle formed between a horizontal plane and a direction of geomagnetism;

second computation means for solving simultaneous equations of the azimuth and the inclination angle, the simultaneous equations being obtained on the basis of the relation between the geomagnetism components in the coordinate system fixed to the device and the geomagnetism components in the terrestrial coordinate system and being specified by the geomagnetism depression angle, to thereby obtain at least one set of computed values of the azimuth and the inclination angle to be used as candidates of the azimuth and the inclination angle; and selection means, operable when a plurality of sets of computed values are obtained, for selecting one set of the computed values among the candidates by referring to the reference data, the selected one set of computed values being used as the final detection values of the azimuth and the inclination angle.

2. An apparatus for detecting azimuth and inclination angle according to claim 1, wherein the second computation means, when only one set of the computed values is obtained by solving the simultaneous equations, outputs the one set of computed values of the azimuth and the inclination angle as the final detection values of the azimuth and the inclination angle.

3. An apparatus for detecting azimuth and inclination angle according to claim 1, wherein the selection means selects one set of the computed values containing the inclination angle which is closer to the inclination angle of the reference data than any other inclination angle(s) contained in remaining set(s) of the computed values and outputs the selected set of the computed values as the final detection values of the azimuth and the inclination angle.

4. An apparatus for detecting azimuth and inclination angle according to claim 1, wherein the geomagnetism-depression-angle obtaining means includes:

geomagnetism-depression-angle computation means for calculating a value corresponding to the geomagnetism depression angle by performing coordinate conversion of the detected geomagnetism components by use of the detected gravitational force components; and averaging means for accumulating the value corresponding to the geomagnetism depression angle and averaging the accumulated values to store the averaged value for use as the geomagnetism depression angle.

5. An apparatus for detecting azimuth and inclination angle according to claim 4, wherein the averaging means includes:

date and time data storing means for obtaining data of date and time when the value corresponding to the geomagnetism depression angle is obtained by the geomagnetism-depression-angle computation means and for storing the obtained data of date and time together with the value corresponding to the geomagnetism depression angle into a table; and data selecting means for selecting the stored values each corresponding to the geomagnetism depression angle in the table used for obtaining the averaged value by eliminating the stored value corresponding to the geomagnetism depression angle which was stored at the timing which is prior to the current date and time by a predetermined amount of time or more.

6. An apparatus for detecting azimuth and inclination angle according to claim 4, wherein the averaging means includes:

position data storing means for obtaining position data of the apparatus when the value corresponding to the geomagnetism depression angle is obtained by the geomagnetism-depression-angle computation means and for storing the obtained position data together with the value corresponding to the geomagnetism depression angle into a table; and data selecting means for selecting the stored values each corresponding to the geomagnetism depression angle in the table used for obtaining the averaged value by eliminating the stored value corresponding to the geomagnetism depression angle which was stored at a position apart from the current position of the apparatus by a predetermined distance or longer.

7. An apparatus for detecting azimuth and inclination angle according to claim 1, wherein the geomagnetism-depression-angle obtaining means includes;

position data obtaining means for obtaining at least current latitude of the apparatus as current position data; and geomagnetism-depression-angle generation means for generating the geomagnetism depression angle from the current position data.

8. An apparatus for detecting azimuth and inclination angle according to claim 1, wherein the apparatus is a portable terminal device.

9. A method of detecting azimuth and inclination angle of a device in which geomagnetism components in a coordinate system fixed to the device and gravitational force components in the coordinate system fixed to the device are detected and final detection values of the azimuth and the inclination angle of the device in a terrestrial coordinate system are generated by use of the geomagnetism components and the gravitational force components, the method comprising steps of:

performing coordinate conversion of the geomagnetism components by use of the gravitational force components to thereby compute the azimuth and the inclination angle, and storing the computed azimuth and inclination angle as reference data;

obtaining a geomagnetism depression angle, which is an angle formed between a horizontal plane and a direction of geomagnetism;

solving simultaneous equations of the azimuth and the inclination angle, the simultaneous equations being obtained on the basis of the relation between the geomagnetism components in the coordinate system fixed to the device and the geomagnetism components in the terrestrial coordinate system and being specified by the geomagnetism depression angle, to thereby obtain at least one set of computed values of the azimuth and the inclination angle to be used as candidates of the azimuth and the inclination angle; and selecting, when a plurality of sets of computed values are obtained, one set of computed values among the candidates by referring to the reference data, the selected one set of computed values being used as the final detection values of the azimuth and the inclination angle.

10. A program for causing a computer to perform the steps of:

detecting geomagnetism components in a coordinate system fixed to a device;

detecting gravitational force components in the coordinate system fixed to the device;

performing coordinate conversion of the geomagnetism components by use of the gravitational force components to thereby compute the azimuth and the inclination angle, and storing the computed azimuth and inclination angle as reference data;

obtaining a geomagnetism depression angle, which is an angle formed between a horizontal plane and a direction of geomagnetism;

solving simultaneous equations of the azimuth and the inclination angle, the simultaneous equations being obtained on the basis of the relation between the geomagnetism components in the coordinate system fixed to the device and the geomagnetism components in the terrestrial coordinate system and being specified by the geomagnetism depression angle, to thereby obtain at least one set of computed values of the azimuth and the inclination angle to be used as candidates of the azimuth and the inclination angle; and selecting, when a plurality of sets of computed values are obtained, one set of computed values among the candidates by referring to the reference data, the selected one set of computed values being used as final detection values of the azimuth and the inclination angle.

* * * * *